(12) United States Patent
Mickle et al.

(10) Patent No.: US 8,091,790 B2
(45) Date of Patent: Jan. 10, 2012

(54) SECURITY FOR BLISTER PACKS

(75) Inventors: Marlin H. Mickle, Pittsburgh, PA (US); Peter J. Hawrylak, Woodstown, NJ (US); Leonid Mats, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 938 days.

(21) Appl. No.: 12/045,787

(22) Filed: Mar. 11, 2008

(65) Prior Publication Data
US 2008/0223936 A1   Sep. 18, 2008

Related U.S. Application Data

(60) Provisional application No. 60/895,297, filed on Mar. 16, 2007.

(51) Int. Cl.
*G06K 19/00* (2006.01)
*G06K 19/06* (2006.01)
*G08B 13/14* (2006.01)

(52) U.S. Cl. ..... 235/492; 235/487; 235/435; 340/572.1; 340/572.3; 340/572.7; 340/572.8

(58) Field of Classification Search ............ 235/487, 235/435; 340/572.1, 572.3, 572.7, 572.8
See application file for complete search history.

(56) References Cited

U.S. PATENT DOCUMENTS

| 4,617,557 | A | 10/1986 | Gordon | |
|---|---|---|---|---|
| 6,411,567 | B1 * | 6/2002 | Niemiec et al. | 368/10 |
| 6,574,166 | B2 * | 6/2003 | Niemiec | 368/10 |
| 6,839,304 | B2 * | 1/2005 | Niemiec et al. | 368/10 |
| 6,839,604 | B2 * | 1/2005 | Godfrey et al. | 700/116 |
| 6,940,408 | B2 * | 9/2005 | Ferguson et al. | 340/572.7 |
| 7,113,101 | B2 * | 9/2006 | Petersen et al. | 340/590 |
| 7,410,103 | B2 * | 8/2008 | Nagel | 235/492 |
| 7,502,666 | B2 * | 3/2009 | Siegel et al. | 700/244 |
| 7,623,040 | B1 * | 11/2009 | Cote | 340/572.8 |
| 7,688,206 | B2 * | 3/2010 | Carrender | 340/572.1 |
| 7,825,807 | B2 * | 11/2010 | Mickle et al. | 340/572.1 |
| 2001/0028308 | A1 * | 10/2001 | De La Huerga | 340/573.1 |
| 2002/0000917 | A1 * | 1/2002 | Rubenstein | 340/573.1 |
| 2002/0017996 | A1 * | 2/2002 | Niemiec | 340/573.1 |
| 2002/0027507 | A1 * | 3/2002 | Yarin et al. | 340/573.1 |
| 2003/0007421 | A1 * | 1/2003 | Niemiec et al. | 368/10 |
| 2004/0178112 | A1 * | 9/2004 | Snyder | 206/534 |

(Continued)

FOREIGN PATENT DOCUMENTS

WO   WO 0205039   1/2002

(Continued)

*Primary Examiner* — Daniel Walsh
(74) *Attorney, Agent, or Firm* — Eckert Seamans Cherin & Mellott, LLC; Philip E. Levy, Esquire

(57) ABSTRACT

Various RFID based blister pack embodiments are provided for improving the ability to detect and prevent tampering and counterfeiting of blister packs and/or facilitating the chain of custody tracking of blister packs during manufacture. Some embodiments employ an RFID chip network on the blister pack and some embodiments employ an RFID strap network on the blister pack, wherein the integrity of the network (or lack thereof) is used to indicate the possibility of tampering. Other embodiments determine the possibility of tampering based on the frequency of an RF signal that is received from a chip provided on the blister pack, which will vary depending on whether the associated antenna has been detuned as a result of some type of tampering.

21 Claims, 13 Drawing Sheets

U.S. PATENT DOCUMENTS

| | | | |
|---|---|---|---|
| 2005/0122219 A1* | 6/2005 | Petersen et al. | 340/568.1 |
| 2005/0237222 A1* | 10/2005 | Bogash et al. | 340/870.07 |
| 2005/0241983 A1* | 11/2005 | Snyder et al. | 206/539 |
| 2005/0259818 A1 | 11/2005 | Silverbrook et al. | |
| 2006/0065670 A1* | 3/2006 | Doublet et al. | 221/1 |
| 2006/0109123 A1* | 5/2006 | Carrender | 340/572.1 |
| 2006/0109130 A1* | 5/2006 | Hattick et al. | 340/572.7 |
| 2006/0173896 A1* | 8/2006 | Lyon et al. | 707/102 |
| 2006/0202830 A1* | 9/2006 | Scharfeld et al. | 340/572.7 |
| 2006/0218011 A1* | 9/2006 | Walker et al. | 705/3 |
| 2006/0283748 A1* | 12/2006 | Daio et al. | 206/460 |
| 2007/0008121 A1 | 1/2007 | Hart | |
| 2007/0018819 A1 | 1/2007 | Streeb et al. | |
| 2008/0027291 A1* | 1/2008 | Williams-Hartman | 600/300 |
| 2008/0061965 A1* | 3/2008 | Kuhns et al. | 340/539.22 |
| 2008/0197042 A1* | 8/2008 | Ullrich | 206/531 |
| 2008/0223936 A1* | 9/2008 | Mickle et al. | 235/492 |
| 2009/0001988 A1* | 1/2009 | Allison et al. | 324/348 |
| 2009/0128299 A1* | 5/2009 | Kirmeier et al. | 340/10.1 |
| 2009/0277815 A1* | 11/2009 | Kohl | 206/531 |
| 2010/0066509 A1* | 3/2010 | Okuizumi et al. | 340/10.5 |
| 2010/0089791 A1* | 4/2010 | Rosenbaum et al. | 206/531 |
| 2011/0037569 A1* | 2/2011 | Kiy | 340/10.1 |

FOREIGN PATENT DOCUMENTS

WO        WO 2008000279 A1 *    1/2008

* cited by examiner

SECURITY FOR BLISTER PACKS

CROSS-REFERENCE TO RELATED APPLICATIONS

This application claims the benefit of U.S. Provisional Application No. 60/895,297, entitled "Security And Item Level RFID On Blister Packs," which was filed on Mar. 16, 2007, the disclosure of which is incorporated herein by reference.

FIELD OF THE INVENTION

The present invention relates to blister packs, and in particular to various RFID based embodiments for improving the ability to detect and prevent tampering and counterfeiting and/or facilitating chain of custody tracking in situations where blister packs are employed.

BACKGROUND OF THE INVENTION

The term blister pack refers to non-reclosable, typically clear plastic packaging commonly used for unit-dose packaging for pharmaceutical dosage forms such as tablets, capsules or lozenges. Blister packs provide a degree of protection where product tampering is a consideration by way of product/packaging integrity. In the United States, blister packs are mainly used for packing physician samples of drug products or for the sale of Over The Counter (OTC) products in the pharmacy.

Blister packs are typically created by means of a form-fill-seal process in which the blister pack is created from rolls of flat sheet or film (made of a plastic material such as polypropylene), filled with the pharmaceutical product and closed (sealed) on the same equipment (typically called a blister-line). Blister packs include two principle components: (1) a formed base which includes the cavities inside which the products fit, and (2) a sealing rupture foil or film (made of, for example, an aluminum foil) which covers the cavities for dispensing the product out of the pack. The blister pack may also include a plastic or paper foil disposed over the sealing foil wherein the attachment between the plastic or paper foil and the sealing foil is stronger that the attachment between the sealing foil and the base so that a portion of the sealing foil (i.e., covering one of the cavities) may be removed as desired.

A typical prior art blister pack 90 is shown in FIGS. 10 (isometric view showing the base side) and 11 (bottom plan view showing the dispensing side). The blister pack 90 includes a base 95 having a plurality of cavities 100 formed therein into which tablets 105 are inserted, and a sealing sheet 110 (which may comprise a number of different layers of material) which covers the base 95. The sealing sheet 110 often includes a foil layer made of a metallic material such as aluminum foil, and may be covered by a covering layer made of a material such as paper.

Key concerns with blister packs that are used in the pharmaceutical industry are tampering and counterfeiting. In particular, with counterfeiting, a counterfeiter may try to open the blister pack and replace the original product with a counterfeit product, or may try to duplicate the blister pack in its entirety. To address these concerns among others, the FDA is likely going to require chain of custody tracking for a variety of pharmaceutical products. There is thus a need for techniques for improving the ability to detect and prevent tampering and counterfeiting and facilitating chain of custody tracking in situations where blister packs are employed.

SUMMARY OF THE INVENTION

In one embodiment, a blister pack is provided that includes a base having a plurality of cavities formed therein, wherein each of the cavities holds one of a plurality of products, such as a tablet or pill, and a sealing sheet provided on top of the base and which covers the cavities. In addition, the blister pack includes a network provided on or within (e.g., on an intermediate layer) one of the sealing sheet or the base. The network is structured to receive one or more RF interrogation signals from a reader device, and includes a plurality of chips (e.g., RFID chips), wherein each of the chips is provided adjacent to a respective one of the products (adjacent meaning within the vicinity of, such that, in a particular embodiment, a chip might actually be near/adjacent to some subset of products including the respective one of the products, wherein the number of chips is less than the number of products). The network has one or more conductors provided on or within the sealing sheet and operatively coupled to one or more of the chips, wherein the network, in response to receiving the one or more RF interrogation signals, provides an indication to the reader device as to whether the network is intact. If the network is not intact, that is viewed as an indication that tampering may have occurred. Every one of the products may have a respective one of the chips adjacent thereto, or, alternatively, less than every one of the products may have a respective one of the chips adjacent thereto.

Preferably, the network and the one or more conductors are structured such that the network will no longer be intact when a portion of the sealing sheet covering one of the cavities is punctured or at least partially separated from the base, or when the base is punctured or otherwise damaged. Most preferably, one or more of the one or more conductors may partially, substantially or entirely surround a top of each of the cavities and are damaged when the portion of the sealing sheet covering the one of the cavities is punctured or at least partially separated from the base, thereby causing the network to no longer be intact. In addition, one or more of the one or more conductors may partially, substantially or entirely surround each of the cavities on the base side.

In one particular embodiment, each of the chips in the network is operatively coupled to an associated antenna (which may be individual or shared) for receiving RF signals from the reader device, wherein at least one of the chips is adapted to transmit information to the reader device and communicate with each of the other ones of the chips through one or more of the one or more conductors. In response to receiving the one or more RF interrogation signals, the at least one of the chips determines whether the network is intact by determining whether it is able to successfully communicate with each of the other one of the chips. In one embodiment, the at least one of the chips transmits a response to the reader device in response to the one or more RF interrogation signals only if it determines that the network is intact, the response being an indication to the reader device that the network is intact, and wherein a lack of the response is an indication to the reader device that the network is not intact. In an alternative embodiment, the at least one of the chips transmits a first response to the reader device in response to the one or more RF interrogation signals if it determines that the network is intact, the response being an indication to the reader device that the network is intact, and wherein the at least one of the chips transmits a second response to the reader device in response to the one or more RF interrogation signals if it determines that the network is not intact, the response being an indication to the reader device that the network is not intact. Alternatively, any one, a combination, or all of the chips may communicate with the reader.

In another particular embodiment, each of the chips is able to receive the one or more RF interrogations signals and is adapted to provide a response to the reader device in response to at least one of the one or more RF interrogation signals, wherein a first condition where each of the chips provides its respective response to the reader device is an indication that the network is intact, and wherein a second condition where less than each of the chips provides its respective response to the reader device is an indication that the network is not intact. Each of the chips may be operatively coupled to an antenna through the one or more conductors, with the antenna receiving the one or more RF interrogations signals, and with each of the chips being adapted to provide its respective response to the reader device through the antenna. The chips may be connected in parallel to one another through the one or more conductors. In addition, each the chips may be part of a respective strap.

In addition, each of the chips may be able to receive the one or more RF interrogations signals though direct coupling between the one or more conductors and one or more touch probes provided on the reader device. Specifically, the chips may connected in parallel to one another through a first one of the one or more conductors and a second one of the one or more conductors, wherein the first one of the one or more conductors is operatively coupled to a first contact and the second one of the one or more conductors is operatively coupled to a second contact, and wherein the coupling between the one or more conductors and the one or more touch probes is through contact between the one or more touch probes and the first and second contacts. The one or more touch probes may be a single touch probe, and the chips may be connected in parallel (or in some series-parallel combination) to one another through a first one of the one or more conductors and a second one of the one or more conductors, wherein the first one of the one or more conductors is operatively coupled to a first terminal of an antenna and the second one of the one or more conductors is operatively coupled to a second terminal of the antenna, through the one or more conductors, and wherein the coupling between the one or more conductors and the one or more touch probes is through contact between one of the first one of the one or more conductors and the second one of the one or more conductors and the single touch probe.

In another embodiment, a blister pack is provided that includes a base having a plurality of cavities formed therein, with each of the cavities holding one of a plurality of products, and a sealing sheet provided on top of the base and covering the cavities. In this embodiment, the one or more networks are provided on or within the sealing sheet and on or within the base, with each of the one or more networks being structured to receive one or more RF interrogation signals from a reader device. Also, each of the one or more networks includes a plurality of chips, with each of the chips being provided adjacent to a respective one of the products, and each of the one or more networks has one or more conductors provided on or within one or both of the sealing sheet and the base and operatively coupled to one or more of the chips. Each of the one or more networks, in response to receiving the one or more RF interrogation signals, provides an indication to the reader device as to whether the network is intact. In still another embodiment, the network may be provided only on the base.

In still a further embodiment, a method of detecting that a blister pack may have been tampered with is provided, wherein the blister pack has a base having a plurality of cavities formed therein, each of the cavities holding one of a plurality of products, and a sealing sheet provided on top of the base and covering the cavities. The method includes providing a chip and an antenna on the blister pack, with the chip being operatively coupled to the antenna, and with the antenna being structured to transmit RF signals having a frequency within a predetermined frequency range when in an undamaged condition and to be detuned when damaged. The antenna, when detuned, is structured to transmit RF signals having a frequency outside of the predetermined frequency range. In other words, its performance will have been modified. The method further includes transmitting an RF interrogation signal from a reader device to the chip, in response to the RF interrogation signal, receiving an RF response signal from the chip that is transmitted through the antenna, and determining whether the blister pack may have been tampered with based on a frequency of the RF response signal (within the predetermined frequency band indicates no tamper, and outside the predetermined frequency band indicates tamper).

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

The present invention provides a radio frequency identification (RFID) based solution that will protect blister packs against tampering and counterfeiting and that may also be used for chain of custody tracking. RFID devices typically contain an integrated circuit chip and an antenna that are connected together to form an electrical circuit that responds to certain transmitted radio frequency (RF) signals. The integrated circuit chip has very small attachment points, commonly referred to as pads, to which the antenna must be electrically connected. Such pads are typically square surfaces with less than 100 μm per side. Antennas used in RFID applications typically have conductors that must be connected to the pads of the integrated circuit chip that have widths of much greater than 100 μm. This difference in relative size makes the manufacture of RFID devices difficult.

As a manufacturing aid, an intermediate fabrication step is frequently employed where an intermediate component is first formed by attaching the integrated circuit chip to relatively short interfacing conductors that have a first end that is much larger than 100 μm and a second end that is sized to accommodate the smaller pads of the integrated circuit chip. This intermediate component that includes the chip and the interfacing conductors is commonly referred to as a strap. Particular strap embodiments are commercially available from a number of sources and are typically sold in large quantities to RFID device manufacturers. In the final manufacturing steps, the strap is attached to the antenna, and both are placed on some form of a substrate. The combination of a strap and an antenna on a substrate is commonly referred to as an inlay. The inlay may later be attached to a label or the like to form an RFID tag that may be attached to a product or item in order to track and/or communicate with the product or item using RF signals.

Figure 1:
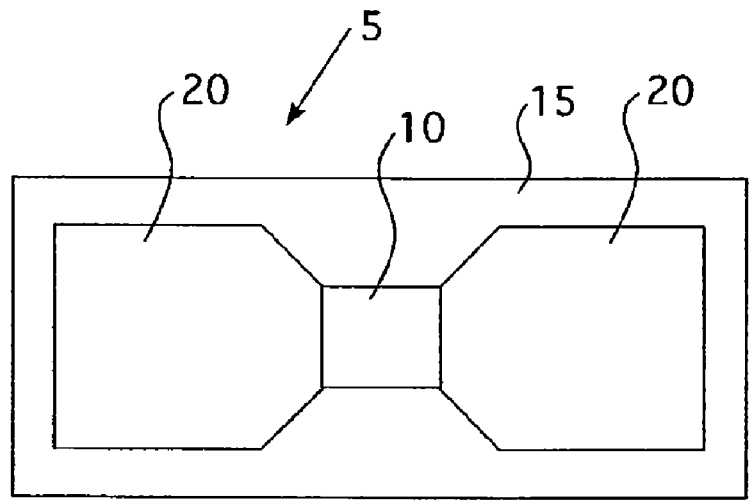
FIG. 1 is a schematic representation of a strap that may be employed in one or more embodiments of the invention.

FIG. 1 is a schematic representation of a strap 5 that may be employed in one or more embodiments of the invention. The strap 5 includes a chip 10 having chip contacts (not shown) that is mounted on and supported by a strap substrate 15. The strap substrate 15 may be made of any of a variety of suitable materials, such as, for example, suitable flexible polymeric materials like PET, polypropylene or other polyolefins, polycarbonate, or polysulfone. The chip 10 may be any of a variety of suitable electronic components for electrically coupling to and suitably interacting with an RFID reader as described herein for example to receive and/or to send signals. The contacts of the chip 10 are electrically coupled to strap leads 20 that are provided on the strap substrate 15. The strap leads 20 may be made out of an electrically conducting material, such as, without limitation, a metal foil, a metal/conductive ink or a conductive polymer as described in, for example, U.S. patent application Ser. Nos. 11/448,516 and 11/430,718, entitled "Method Of Making An Electronic Device Using An Electrically Conductive Polymer, And Associated Products," the disclosures of which are incorporated herein by reference. In some embodiments, the strap leads 20 may include an electrically insulating material along selected portions of the conducting material. Alternatively, the strap leads 20 may include a dielectric material with conductive layers on one or both sides.

Figure 2:
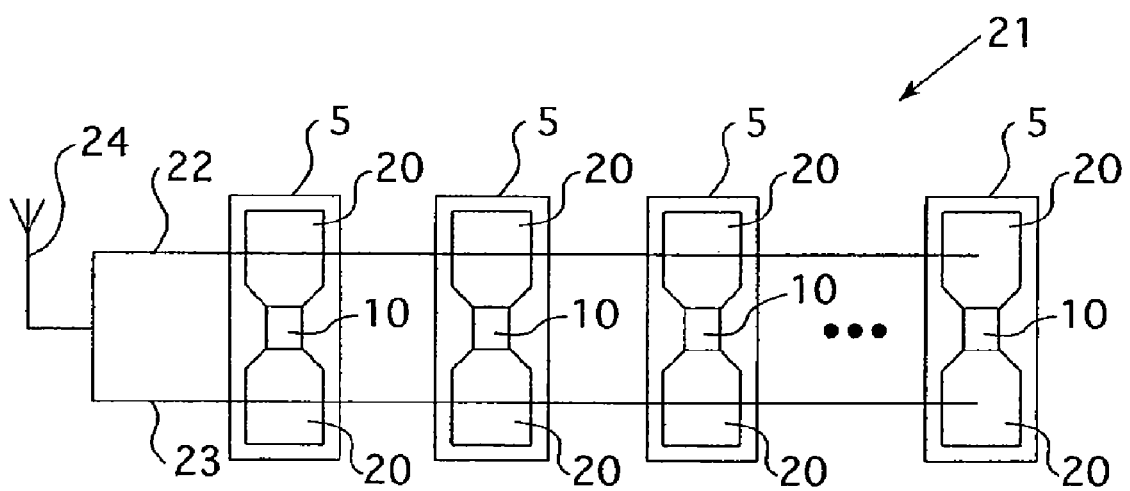
FIGS. 2, 3, 4 and 5 are schematic representations of different embodiments of a strap network that may be employed in one or more embodiments of the invention.

Normally, the strap leads 20 are operatively coupled, through a suitable electrically-conductive connection, to an antenna provided on a substrate to form an inlay and thus form an RFID transponder, also known as a tag. However, in various embodiment of the concept described herein, a plurality of straps 5 may be used to form a strap network 21 as shown in FIG. 2. As seen in FIG. 2, the strap network 21 includes a plurality of straps 5 that are connected in parallel. In particular, the top strap leads 20 of each of the straps 5 are electrically coupled to one another by a first conductor 22 and the bottom strap leads 20 of each of straps 5 are electrically coupled to one another by a second conductor 23. The first and second conductors 22 and 23 may be made out of any suitable electrically conducting material, such as, without limitation, a metal foil, a metal/conductive ink or a conductive polymer. The first and second conductors 22, 23 are then operatively coupled to an antenna 24, such as, for example, a square spiral antenna or an other suitable antenna type, to enable the strap network 21 to communicate using RF signals over an air interface with, for example, an RFID reader. In addition, each of chips 10 forming a part of the straps 5 is provided with control circuitry, such as a microprocessor, a microcontroller or some other suitable custom control circuitry, and an associated memory. Furthermore, each chip 10, and thus each strap 5, is associated with a unique identifier that enables the memory of each of the chips 10 to be selectively accessed by the RFID reader over the air interface through the antenna 24. Thus, the strap network 21 provides increased memory capacity as compared to a single strap 5 (or RFID tag made with a strap 5).

Moreover, each strap 5 in the strap network 21 is, in the preferred embodiment, a passive strap, meaning it does not have an internal power supply. Instead, such passive straps (and passive RFID tags) are powered by electrical current that is induced therein by the RF signal sent by an RFID reader. Specifically, in the strap network 21, if the transmitted RF power is large enough, the electrical current induced in the antenna 24 by the incoming RF signal from the RFID reader will provide enough power for each of the chips 10 to power up and function, e.g., transmit a response. One passive tag technology, known as backscatter technology, generates signals by backscattering the carrier signal sent from the RFID reader. In another technology, described in U.S. Pat. Nos. 6,289,237, 6,615,074, 6,856,291, 7,057,514, and 7,084,605, the disclosures of which are incorporated herein by reference, RF energy from the RFID reader is harvested and converted to a DC voltage by an antenna/matching circuit/charge pump combination. The DC voltage is then used to power the circuitry (e.g., a processor/transmitter combination) that transmits information to the RFID reader at, for example, a different frequency.

In many applications, particularly those governed by FCC regulations, the RF power transmitted by the RFID reader will not be large enough to power each of the chips 10 in the strap network 21 shown in FIG. 2, at least not at all distances from the reader that may be required for a particular application. Thus, described herein are two alternate strap network embodiments, shown in FIGS. 3 and 4 as strap networks 21' and 21", that use touch probe technology to provide power and communicate with (i.e., read) each of the chips 10 rather than communicating over an air interface through RF signals using the antenna 24.

Figure 3:
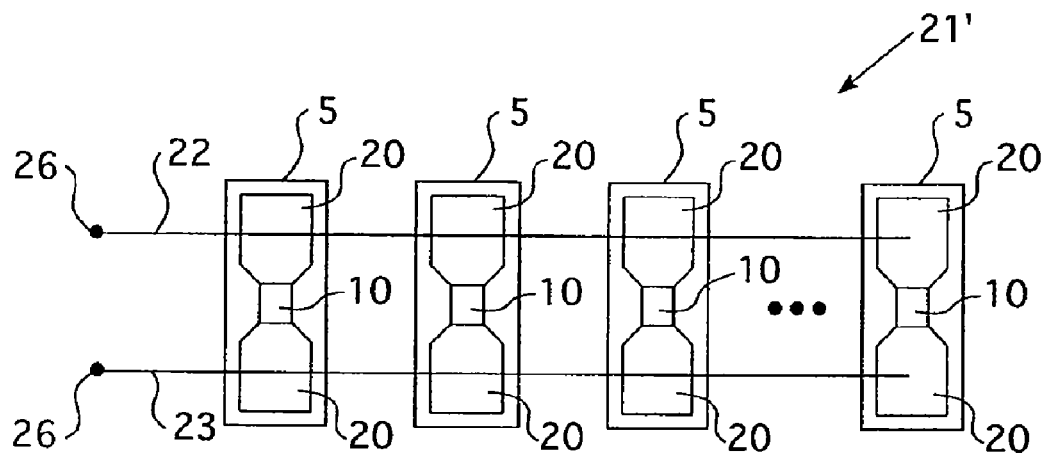
Figure 4:
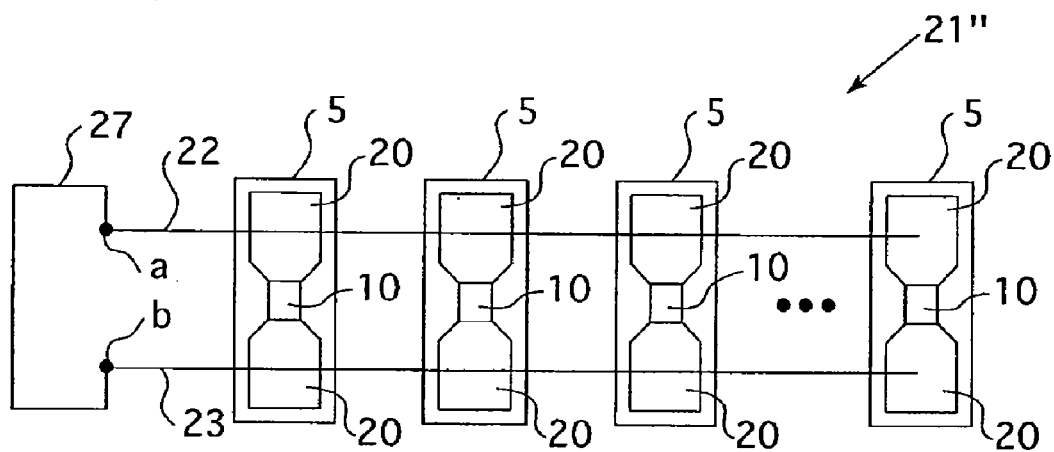

FIG. 3 shows a strap network 21' according to one particular embodiment wherein the strap network 21' is able to communicate with an RFID reader without operatively coupling the strap network 21' to an antenna. As seen in FIG. 3, in the strap network 21', each conductor 22, 23 terminates at a contact 26 rather than being connected to the antenna 24. FIG. 4 shows a strap network 21" according to another particular embodiment wherein the strap network 21" is also able to communicate with an RFID reader without operatively coupling the strap network 21" to the antenna 24. As seen in FIG. 4, the strap network 21" includes an antenna 27 wherein the terminal a of the antenna 27 is connected to the conductor 22 and the terminal b of the antenna 27 is connected to the conductor 23. In an alternative embodiment, the terminal a of the antenna 27 is connected to either the conductor 22 or the conductor 23, and the terminal b of the antenna 27 is not connected to the strap network 21" at all. Preferably, the antenna 27 has a generally square shape so as to form a conductive loop as shown in FIG. 4. The antenna 27 may also take on other shapes and/or configurations, such as a circular or spiral (coil) shape, that may be necessary to achieve desired characteristics (e.g. input impedance and power).

As described in more detail below, in the case of either the strap network 21' or the strap network 21", a direct electrical connection is made between the strap network 21' or the strap network 21", and in particular the conductors 22 and/or 23 thereof, and a properly equipped RFID reader to enable signals to be communicated between the RFID reader and the strap network 21' or the strap network 21" (and in particular the chips 10 provided therein). As will be appreciated, a similar direct electrical connection may be made between the strap network 21, and in particular the conductors 22 and/or 23 thereof, and a properly equipped RFID reader, in which case the functionality of the antenna 24 will not be used. However, for illustrative purposes, the strap network 21' and the strap network 21" embodiments will used in the description provided below.

Figure 5:
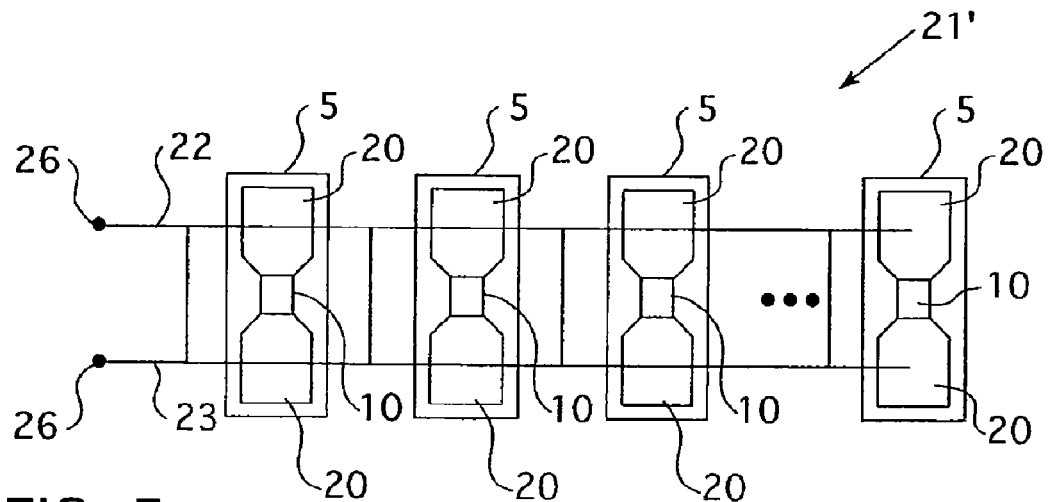

Additionally, in any of the embodiments of the strap network 21, 21', or 21", there may be multiple antenna type connections between the conductors 22 and 23, as shown in, for example, the modified strap network 21' FIG. 5. The main purpose of such inter-terminal connectivity is to provide connection redundancy and a single contact probe.

Figure 6:
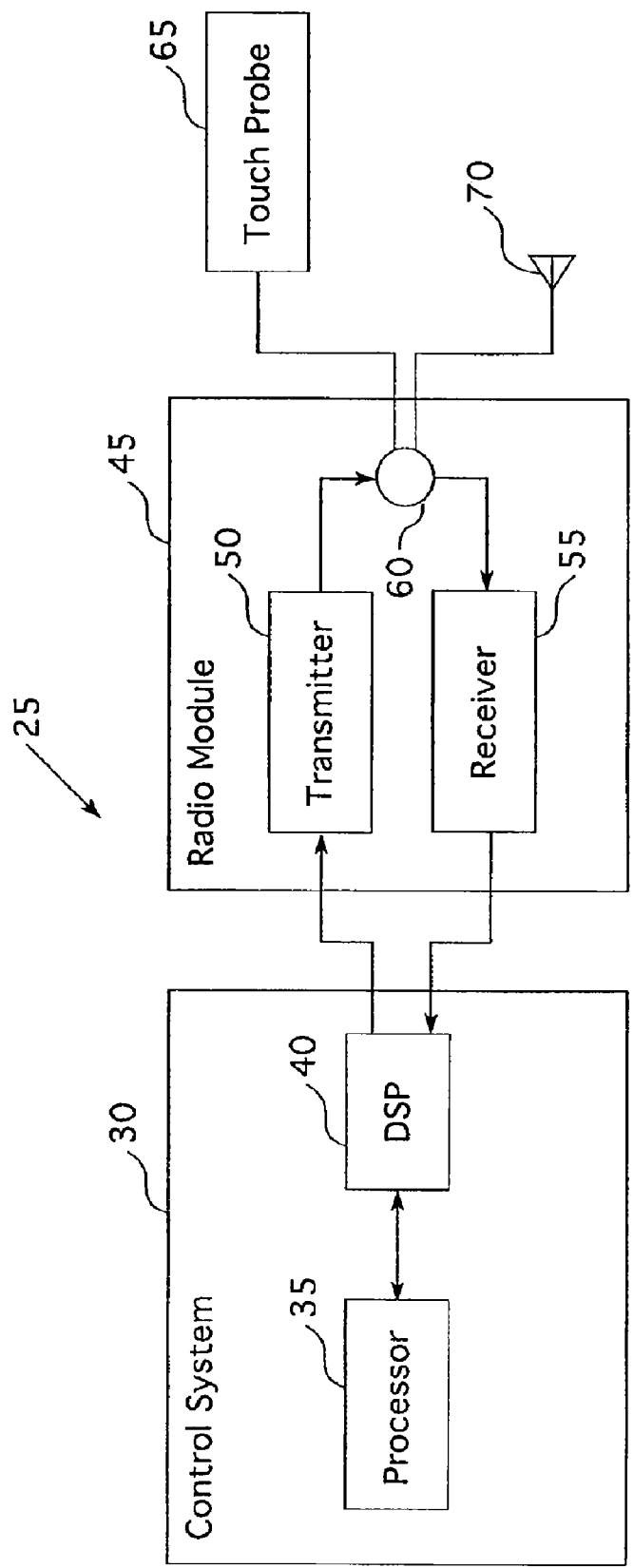
FIG. 6 is a block diagram of an RFID reader employing touch probe technology that may be used one or more embodiments of the invention.

In order to fully understand the operation of the strap network 21' and the strap network 21", it will be necessary to describe an embodiment of the particular type of RFID reader that must be used therewith. FIG. 6 is a block diagram of such an RFID reader 25. The RFID reader 25 includes a control system 30 and a radio module 45. In the preferred embodiment shown in FIG. 6, the control system 30 includes a processor 35, such as a microcontroller or microprocessor, and a digital signal processor (DSP) 40, although other configurations are possible. The processor 35 provides control over high level operation of the RFID reader 25 and may communicate with an external network and/or peripheral devices. The DSP 40 provides direct control over all operations of the radio module 45 in response to high level commands provided by the processor 35, and processes data signals received from individual RFID tags and/or strap networks as described herein. The radio module 45 is adapted to provide for communications to/from RFID tags or strap networks (e.g., strap network 21) provided with a suitable antenna (e.g., antenna 24), by generating and receiving RF signals in the manner described herein.

More particularly, the radio module 45 further comprises a transmitter portion 50, a receiver portion 55, and a hybrid 60. The hybrid 60 may further comprise a circulator. The transmitter portion 50 preferably includes a local oscillator that generates an RF carrier frequency. The transmitter portion 50 sends a transmission signal modulated by the RF carrier frequency to the hybrid 60, which in turn passes the signal to either or both of a touch probe 65 provided as part of the RFID reader 25 and an antenna 70 provided as part of the RFID reader 25. The hybrid 60 connects the transmitter 50 and receiver 55 portions to the touch probe 65 and antenna 70 while isolating them from each other. In particular, the hybrid 60 allows a strong signal to be sent from the transmitter portion 50 while simultaneously receiving a weak signal reflected from an RFID tag or strap network. The touch probe 65 includes one or more electrical contacts or leads that are adapted to be selectively and temporarily mated and brought into electrical contact with both of the contacts 26 of the strap network 21' (in which case the touch probe 65 would include at least two electrical contacts) or either of the conductors 22 or 23 of the strap network 21" (in which case the touch probe 65 would include at least two electrical contacts). In the case where both terminals a and b are connected to the conductors 22, 23 (as in FIG. 4), the probe contact may touch either one of the conductors 22, 23, and in the case where only either the terminal a or the terminal b is connected to one of the conductors 22, 23, the probe contact should touch the same conductor 22, 23. As such, the signals generated by the RFID reader 25, that normally would be sent over an air interface, may instead be directly transmitted to the strap network 21' or the strap network 21", as the case may be, and thus the chips 10 provided therein. Those signals, which are RF signals, are also used to provide power to the strap network 21' or the strap network 21", as the case may be, as described elsewhere herein. Similarly, the signals generated by the chips 10, that also normally would be sent via antenna over an air interface to the RFID reader 25, may instead be directly transmitted to the RFID reader 25 through the touch probe 65. The antenna 70, on the other hand, enables communication with conventional RFID tags that are equipped with an antenna (or the strap network 21 including the antenna 24) by broadcasting the modulated signal generated by the RFID reader 25 (which may be received by the conventional RFID tags or the strap network 21) and capturing any signals radiated by the conventional RFID tags or the strap network 21.

The tag/network signals, whether they are transmitted through the touch probe 65 or captured by the antenna 70, are passed back to the hybrid 60, which forwards the signals to the receiver portion 55. The receiver portion 55 mixes the captured signals with the RF carrier frequency generated by the local oscillator to directly downconvert the captured signals to a baseband information signal, which is sent to the DSP 40 for processing thereby. In an alternative embodiment, the antenna 70 may be omitted from the RFID reader 25. As will be appreciated, in such a configuration, it will not be possible to communicate using an air interface with conventional RFID tags equipped with an antenna, but instead all communication will need to be performed through a direct connection to the touch probe 65.

Figure 7A:
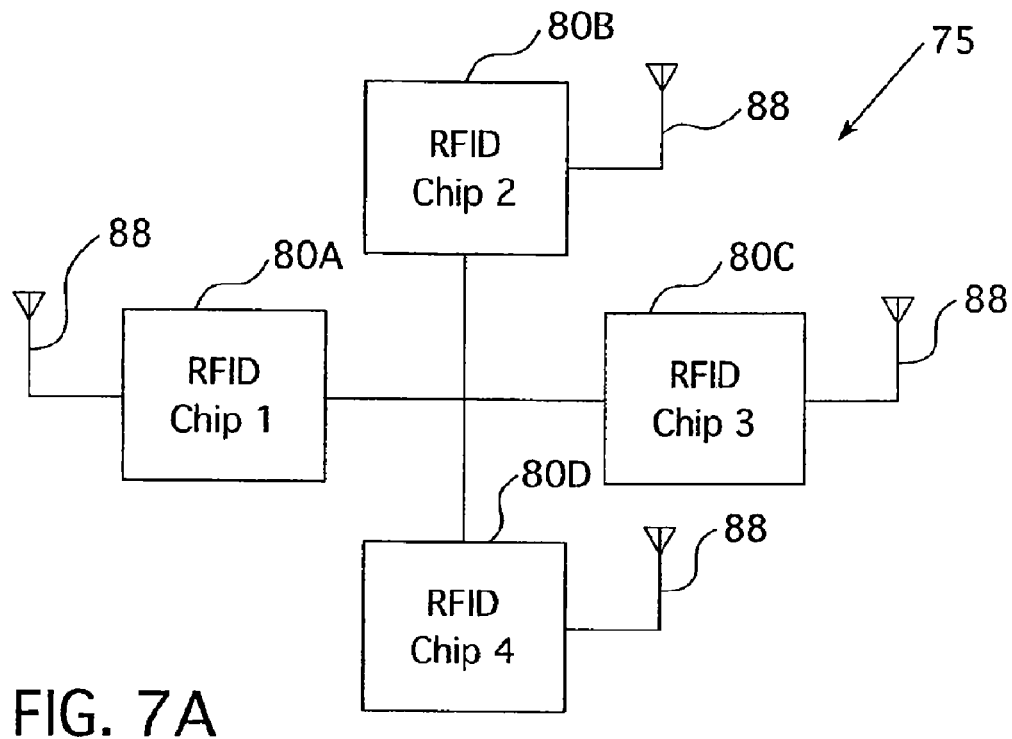
FIGS. 7A, 7B, 8 and 9 are schematic diagrams of different embodiments of an RFID chip network that may be employed in one or more embodiments of the present invention.
Figure 7B:
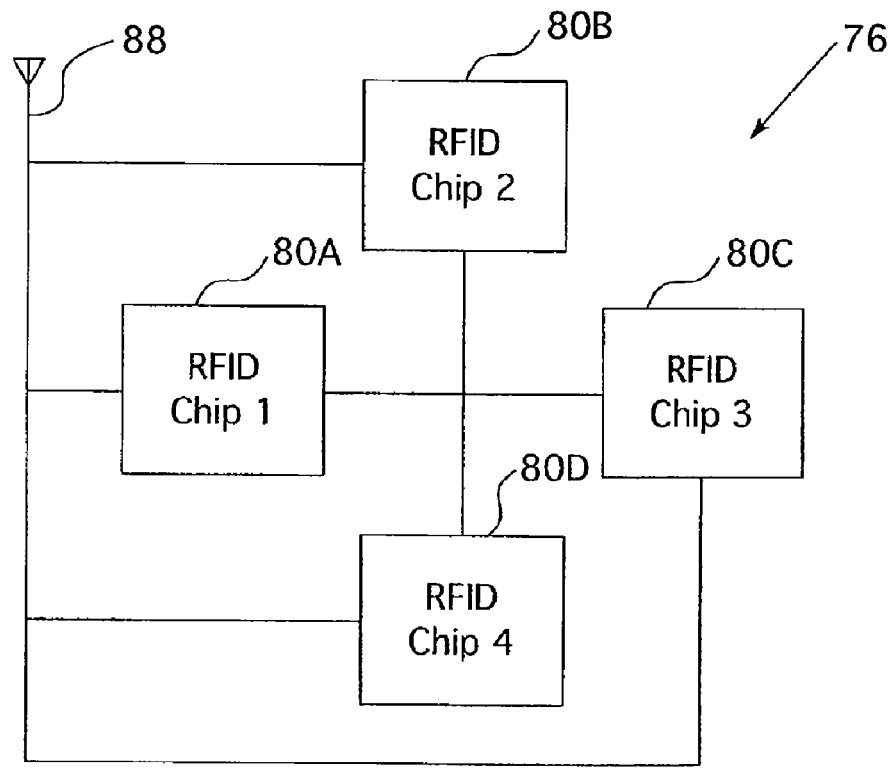

FIG. 7A is a schematic diagram of an RFID chip network 75 that may also be employed in one or more embodiments of the present invention. The RFID chip network 75 includes a plurality of RFID chips 80, designated as 80A, 80B, 80C, 80D, wherein each RFID chip 80A, 80B, 80C, 80D is operatively coupled to an antenna 88. Although only four RFID chips 80A, 80B, 80C, 80D are shown, this is meant to be exemplary only and it should be appreciated that the RFID chip network 75 may employ two, three, or five or more chips 80. As seen FIG. 7A, the RFID chip 80A is operatively coupled to each of the other RFID chips 80B, 80C, 80D so that the RFID chip 80A can communicate with each of the other RFID chips 80B, 80C, 80D. That coupling may be by way of DC connections, as shown in FIG. 7A, or, alternatively, an AC coupling (without any physical connections). The coupling may also be established such that each of the RFID chips 80A, 80B, 80C, 80D can selectively communicate with any of the other RFID chips 80A, 80B, 80C, 80D. Each of the RFID chips 80A, 80B, 80C, 80D is preferably a passive chip, meaning that it is powered by electrical current that is induced therein by the RF signal sent by an RFID reader and received by the antenna 88 as described elsewhere herein. FIG. 7B illustrates the above described connectivity with a single antenna 88 in an RFID chip network 76. Otherwise, the performance and function of the RFID chip network 76 is similar to the performance and function of the RFID chip network 75 described elsewhere herein.

In the embodiment shown in FIG. 7A, the RFID chip 80A is provided with at least the following: (i) the communications circuitry (e.g., a transceiver or separate transmit and receive elements) required to communicate with an RFID reader using RF signals over an air interface, (ii) memory, and (iii) the circuitry needed for powering the RFID chip 80A (e.g., a matching circuit/charge pump combination for converting RF to DC), and each of the other RFID chips 80B, 80C, 80D is provided with at least the following: (i) logic circuitry to enable it to communicate with the RFID chip 80A via either the DC or AC coupling described above as appropriate (or each of the other chips 80A, 80B, 80C, 80D if that embodiment is employed), (ii) memory, and (iii) the circuitry needed for powering the RFID chip 80B, 80C, 80D (e.g., a matching circuit/charge pump combination for converting RF to DC). In other words, the RFID chips 80B, 80C, 80D in this embodiment do not include the communications circuitry required to communicate with an RFID reader using RF signals over an air interface, and thus the RFID chip 80A is considered the "communicating chip" for the RFID chip network 75. As a result, the silicon area of the RFID chips 80B, 80C, 80D that otherwise would have been used for the communications circuitry (which space is valuable) may be used for other purposes, such as, for example, additional memory, sensors (e.g., a temperature sensor or strain gauge) and/or additional logic circuitry. Thus, each of the other RFID chips 80B, 80C, 80D is operatively coupled to its respective antenna 88 not for communications purposes, but instead so that it may be powered by the RF signal from the RFID reader.

In operation, when the RFID chip 80A receives an interrogation signal from an RFID reader, it first polls each of the other RFID chips 80B, 80C, 80D to determine whether the entire RFID chip network 75 is still intact, and according to an embodiment of the invention, the RFID chip 80A will only respond to the RFID reader if it determines that the entire RFID chip network 75 is intact (i.e., by receiving an affirmative answer from each of the chips 80B, 80C, 80D to its polling signal). Intact as used herein shall, in this context (i.e., in the context of an RFID chip network), mean that each of the chips 80A, 80B, 80C, and 80D in the RFID chip network 75 is connected to the RFID chip network 75 as is able to communicate with one or more of the other chips 80A, 80B, 80C, and 80D. In this embodiment, no signal is sent to the RFID reader if the RFID chip 80A determines that the entire RFID chip network 75 is not intact. In an alternative embodiment, after the polling is complete, the RFID chip 80A will respond to the RFID reader with a signal indicating whether or not the entire RFID chip network 75 is intact (i.e., a yes (intact) or no (not intact) signal).

In an alternative embodiment, each of the RFID chips 80A, 80B, 80C, 80D includes the communications circuitry required to communicate with an RFID reader using RF signals over an air interface and each of the RFID chips 80A, 80B, 80C, 80D is therefore a "communicating chip." In this embodiment, when the RFID chips 80A, 80B, 80C, 80D receive an interrogation signal from an RFID reader, they will each first poll each of the other RFID chips 80A, 80B, 80C, 80D to determine whether the entire RFID chip network 75 is still intact, and will provide an appropriate signal (or no signal at all), as described above, based on the polling results. In the case where signals are to be sent to the RFID reader, they will preferably be sent in a predetermined sequence by the RFID chips 80A, 80B, 80C, 80D. Thus, in this embodiment, the RFID reader will get an indication from each of the RFID chips as to whether the RFID network 75 is intact.

In applications where the different embodiments of the RFID chip network 75 are employed, special design considerations will need to be given to the RFID reader that is used. In particular, that RFID reader will need to be designed/programmed to give the RFID chip network 75 sufficient time to conduct the polling described herein so that a proper determination as to the integrity of the RFID chip network 75 can be made. Current RFID readers typically will time out after a certain amount of time following the issuance of an interrogation signal if a response is not received, which time may not be sufficient for the polling to take place. Such readers therefore would not be appropriate for use in connection with the RFID chip network 75.

Figure 8:
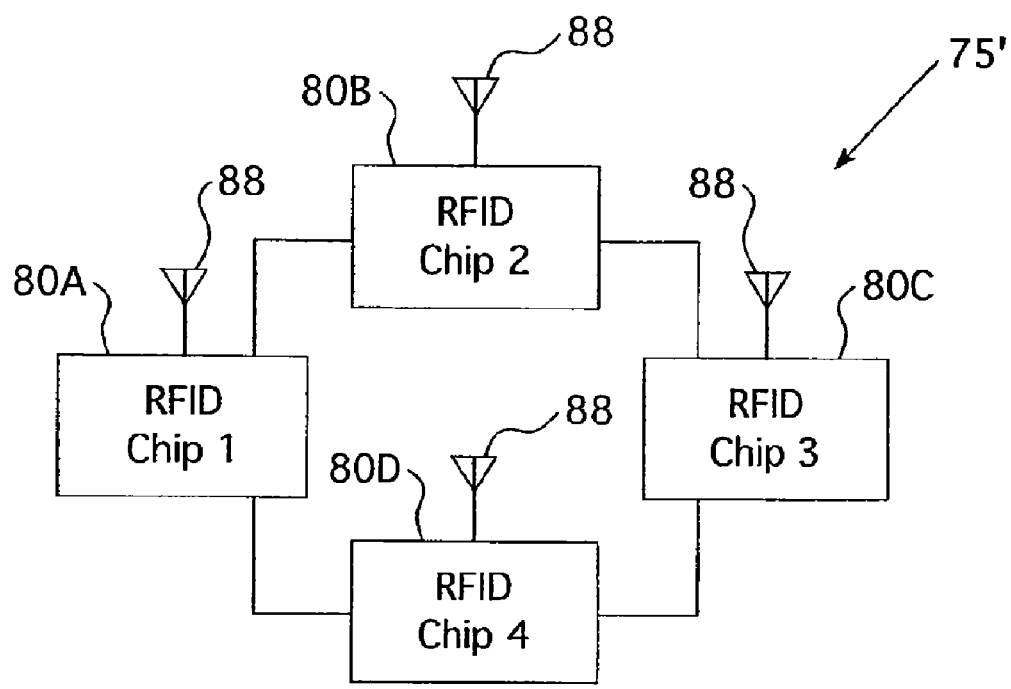
Figure 9:
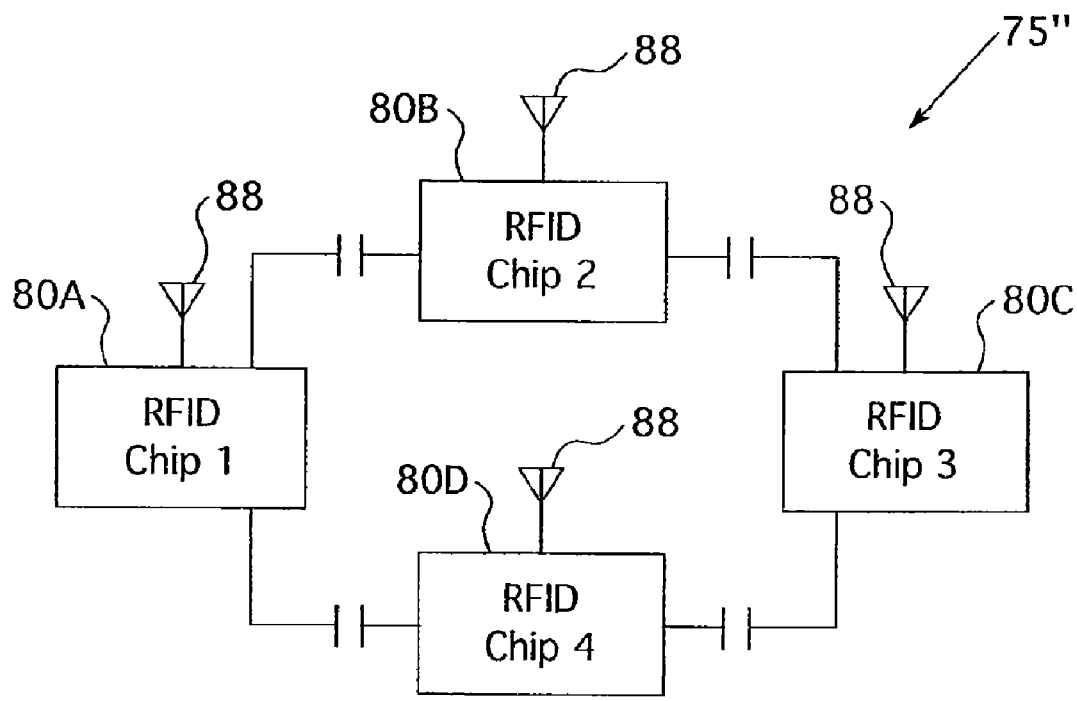

FIGS. 8 and 9 show RFID chip networks 75' and 75", respectively, which are suitable preferred alternatives to the RFID chip network 75. In the RFID chip networks 75" of FIG. 9, the capacitance may be parasitic due to proximity of two conductors where the two conductors may be the antennas of each chip/antenna combination. The RFID chip networks 75' and 75" may, alternatively, employ a single antenna as in FIG. 7B.

Figure 10:
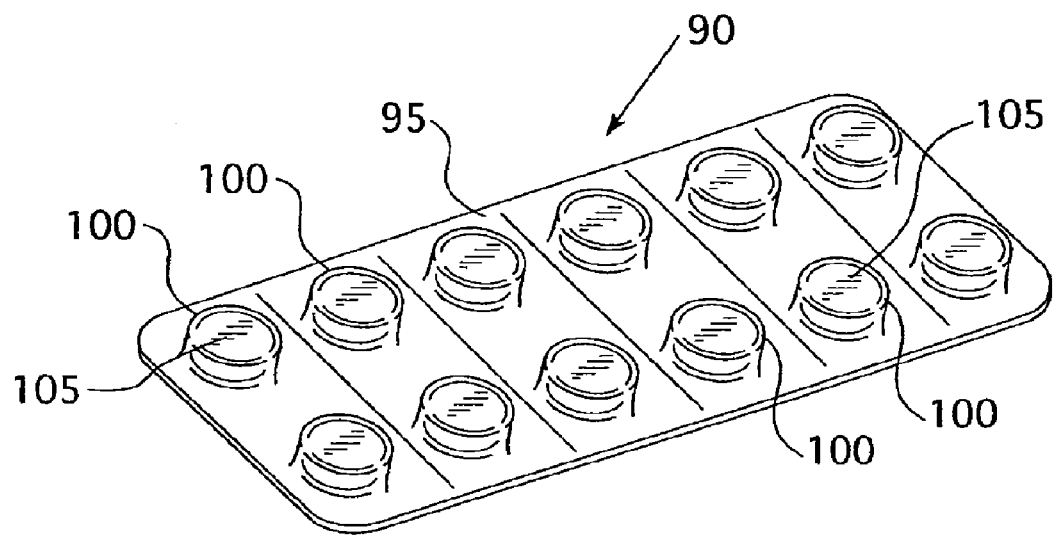
FIG. 10 is an isometric view and FIG. 11 is a bottom plan view of a prior art blister pack.
Figure 11:
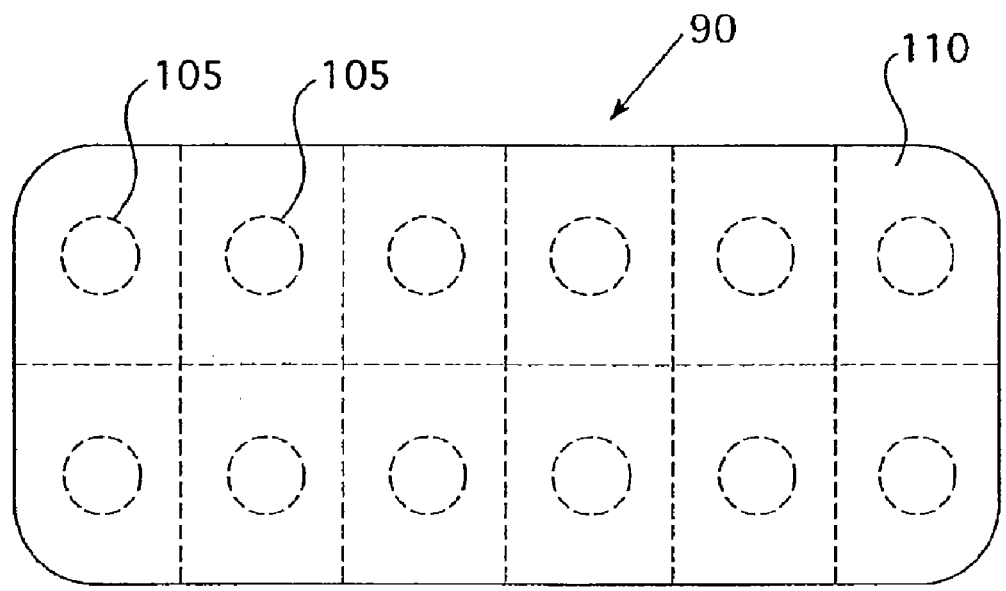
Figure 12:
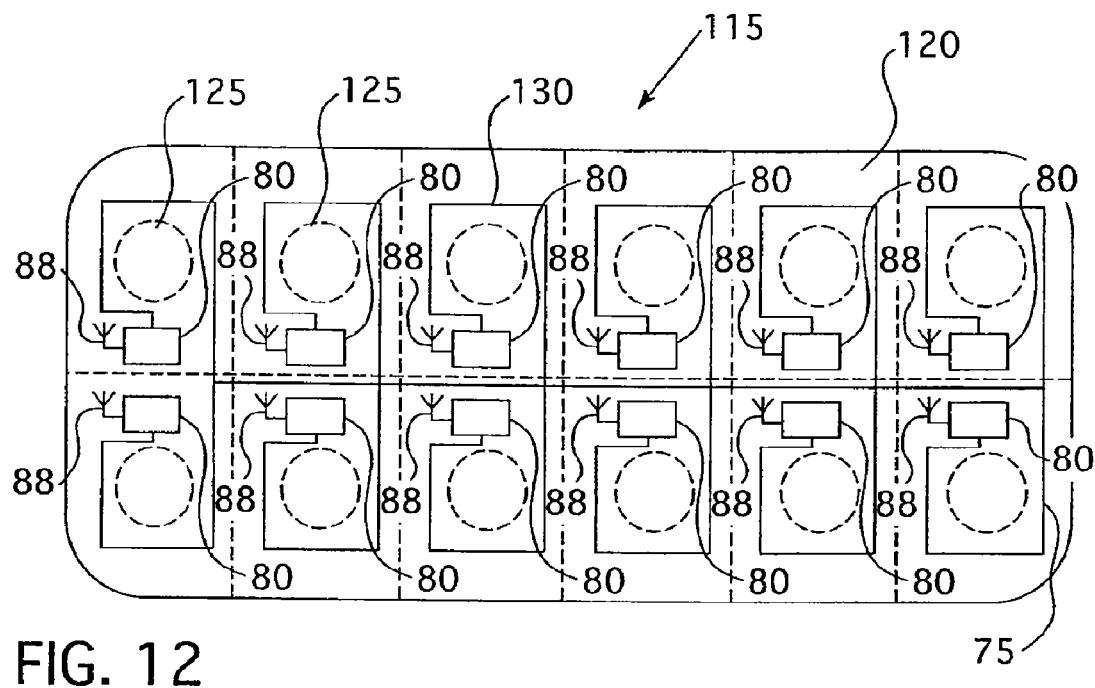
FIGS. 12, 13, 14 and 15 are bottom plan views of blister packs according to different embodiments of the present invention.

FIG. 12 is a schematic diagram of a blister pack 115 according to one embodiment of the present invention. The blister pack 115 is similar to the blister pack 90 shown in FIGS. 10 and 11 in that it includes a sealing sheet 120 which covers a base having a plurality of cavities formed therein into which tablets 125 are inserted. The blister pack 115, however, further includes an RFID chip network 75 as described in connection with FIG. 7A (or alternatively FIG. 7B, 8 or 9) that includes a plurality of chips 80 interconnected as described elsewhere herein by a conductor 130 provided on the sealing sheet 120. In FIG. 12, the conductor 130 is shown as being provided on the outer surface of the sealing sheet 120 (i.e., the surface facing away from the base), but it may also be provided elsewhere, such as on the inner surface of the sealing sheet 120 or on some intermediate layer of the sealing sheet 120. The conductor 130 may be made out of any suitable electrically conducting material, such as, without limitation, a metal foil, a metal/conductive ink or a conductive polymer. In the particular embodiment shown in FIG. 12, the RFID chip network 75 is provided on top of the outer surface of the sealing sheet 120 with a chip 80 being provided at a position adjacent to each of the tablets 125 (or other products) held by the blister pack 115 (i.e., in a position adjacent to each cavity of the blister pack 115; or alternatively, a chip 80 may be positioned adjacent to some subset of tablets 125). In addition, as seen in FIG. 12, the conductor 130 preferably substantially or entirely surrounds each of the tablets 125 (or other products) held by the blister pack 115 for reasons to be described below.

The blister pack 115 facilitates the monitoring of possible tampering and/or counterfeiting through the monitoring of the integrity of the RFID chip network 75 by an RFID reader. In particular, if an individual partially or completely removes or punctures the portion of the sealing sheet 120 covering one of the tablets 125 (in order to access and/or switch one of the tablets 125), the conductor 130 adjacent to that tablet (or any member of an above described subset) and connected to the associated chip 80 will be damaged or broken, thereby breaking the RFID chip network 75 (i.e., the RFID chip network 75 is no longer intact). As a result, if the RFID reader sends an interrogation signal to the blister pack 115, it will, depending on the embodiment of the RFID chip network 75 that is implemented, either not return a signal or return a signal indicating that the RFID chip network 75 is not intact, which may be interpreted as a possible tamper and/or counterfeit situation. Conversely, if the RFID reader sends an interrogation signal to the blister pack 115 and it (through either the communicating chip 80 or each chip 80, depending on the particular embodiment of the RFID chip network 75 that is implemented) returns a signal or signals indicating that the RFID chip network 75 is intact, there will be a certain level of confidence that no tampering or counterfeiting has occurred. As will be appreciated, since the sealing sheet of most blister packs often includes a conductive material, it may be necessary to modify the particular sealing sheet 120 that is used so that it includes a non-conductive material for receiving the RFID chip network 75 to ensure proper functioning of the RFID chip network 75. As discussed elsewhere herein, each chip 80 in the RFID chip network is powered by the RF energy received from the RFID reader through the associated antenna 88 (see FIG. 7). In addition, although it may not be quite effective as a DC coupled RFID chip network 75 (shown in FIG. 12), the RFID network may be implemented using AC coupling as described elsewhere herein. Furthermore, it is not necessary that the RFID chip network 75 include a chip 80 adjacent to each tablet 125, but instead may include a chip 80 adjacent to every other tablet 125, or every third tablet 125, etc.

In addition, one or more of the chips 80 may be used to monitor the locations/chain of custody of the blister pack 115 as it moves through the manufacturing and/or distribution process. In such a case, the one or more chips 80 may carry an identifier for the blister pack 115 and may be selectively read by suitable RFID readers throughout the chain of custody.

Figure 13:
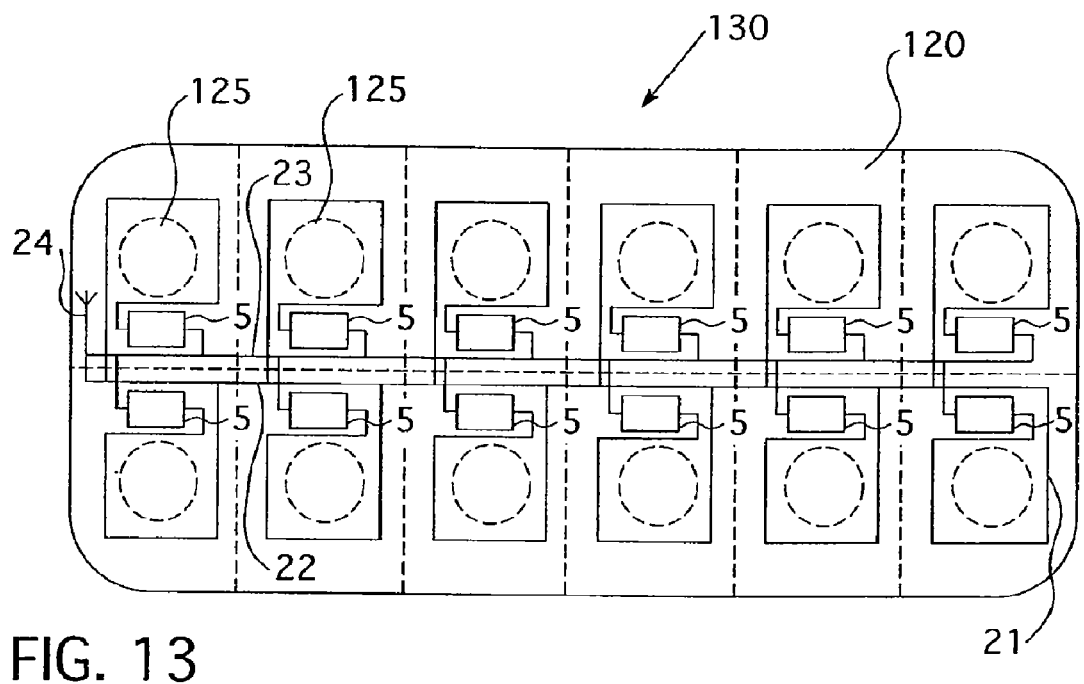

FIG. 13 is a schematic diagram of a blister pack 130 according to another embodiment of the present invention. The blister pack 130 is similar to the blister pack 115, except that instead of including an RFID chip network 75, it includes a strap network 21 as described in connection with FIG. 2 that includes a plurality of straps 5 connected in parallel as described elsewhere herein by conductors 22 and 23 provided on the sealing sheet 120 (on the outer surface, the inner surface, or some intermediate layer). The conductors 22 and 23 are operatively coupled to the antenna 24, and may be made out of any suitable electrically conducting material, such as, without limitation, a metal foil, a metal/conductive ink or a conductive polymer. In the particular embodiment shown in FIG. 13, the strap network 21 is provided on top of the outer surface of the sealing sheet 120 with a strap 5 being provided at a position adjacent to each of the tablets 125 (or other products) held by the blister pack 130 (i.e., in a position adjacent to each cavity of the blister pack 130). In addition, as seen in FIG. 13, the conductors 22, 23 preferably substantially or entirely surround each of the tablets 125 (or other products) held by the blister pack 130.

The blister pack 130 facilitates the monitoring of possible tampering and/or counterfeiting through the monitoring of the integrity of the strap network 21 by an RFID reader. Like in the blister pack 115, if an individual partially or completely removes or punctures the portion of the sealing sheet 120 covering one of the tablets 125 (in order to access and/or switch one of the tablets 125), the conductors 22 and/or 23 adjacent to that tablet (or any member of an above described subset) and connected to the associated strap 5 will be damaged or broken, thereby causing the strap network 21 to no longer be intact. As used herein, intact shall mean, in this context (i.e., in the context of a strap network), that each of the straps 5 is connected to the network such that each strap 5 can receive an RF signal sent from a reader device through the network In the strap network 21, if an RFID reader sends an interrogation signal or signals (addressing each strap 5) to the strap network 21, it will, if the strap network 21 is intact, expect to receive a response from each of the straps 5. However, if the strap network 21 is not intact as a result of damage to the conductors 22, 23, one or more of the straps 5 will not provide a response, which may be viewed as an indication of a possible tamper and/or counterfeit situation. It is not necessary that the strap network 21 include a strap 5 adjacent to each tablet 125, but instead may included a strap 5 adjacent to every other tablet 125, or every third tablet 125, etc. Also, the network may be implemented with just chips 10 (separate from the straps 5) with appropriate connections being made between the conductors 22, 23 and the contacts of the chips 10.

In addition, one or more of the chips 10 may be used to monitor the locations/chain of custody of the blister pack 130 as it moves through the manufacturing and/or distribution process. In such a case, the one or more chips 10 may carry an identifier for the blister pack 130 and may be selectively read by suitable RFID readers throughout the chain of custody.

Figure 14:
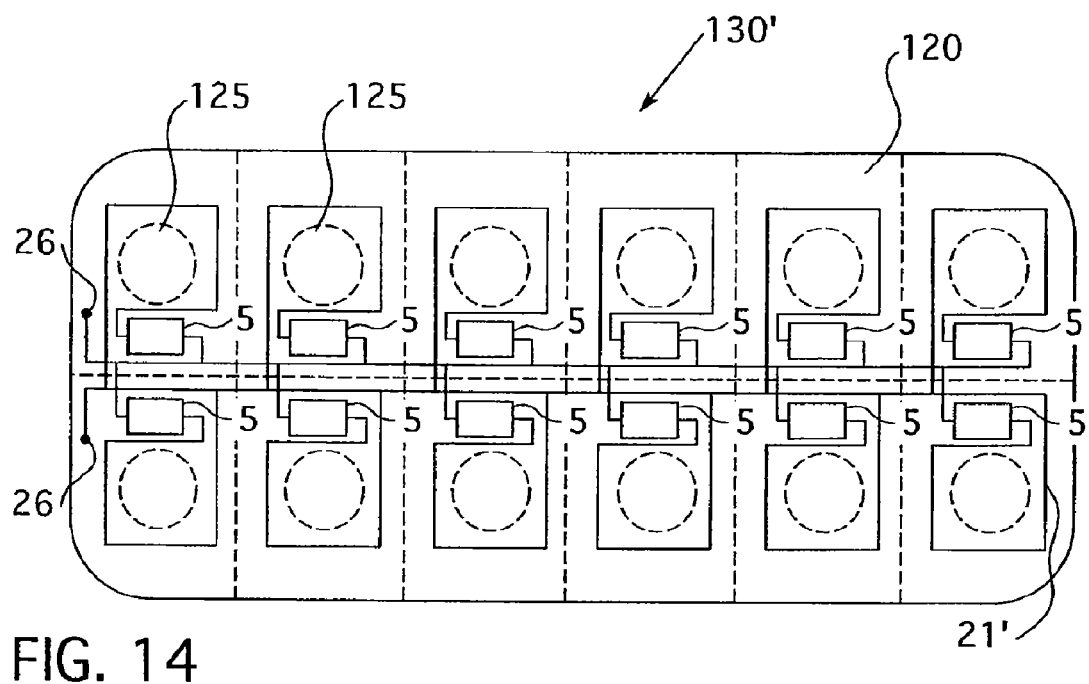
Figure 15:
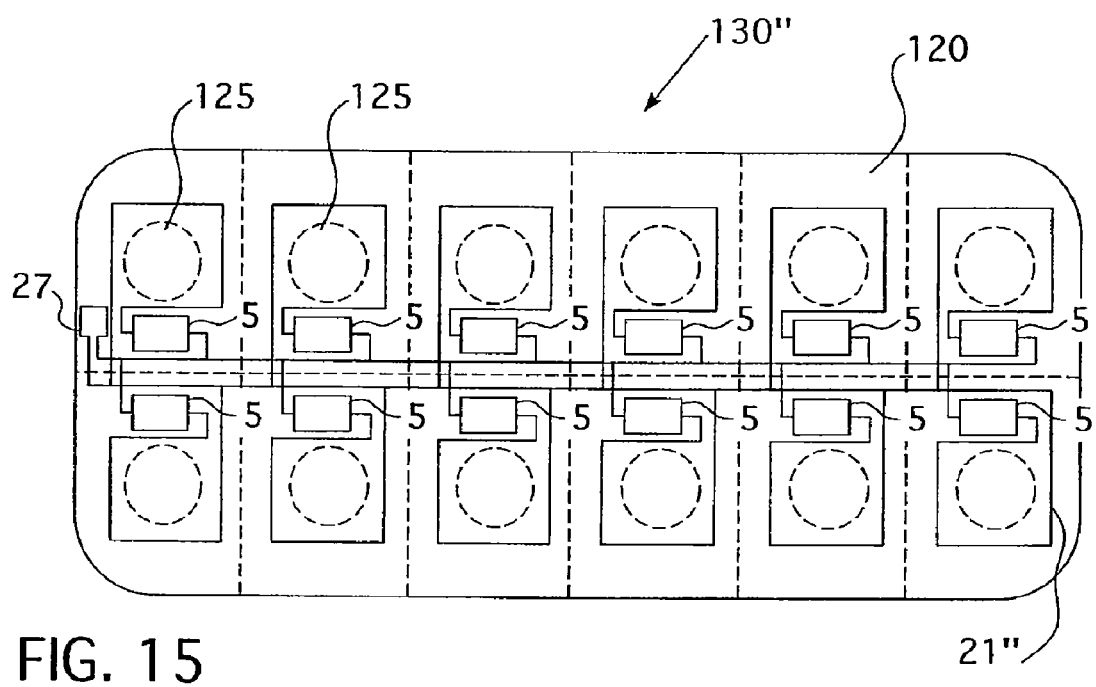

FIGS. 14 and 15 are schematic diagrams of a blister pack 130' and a blister pack 130", respectively, according to alternative embodiments of the present invention that employ the touch probe technology described elsewhere herein. In the blister pack 130', the strap network that is employed is a strap network 21' as shown in FIG. 3, and the in the blister pack 130", the strap network that is employed is a strap network 21" as shown in FIG. 4. The blister packs 130' and 130" facilitate the monitoring of possible tampering and/or counterfeiting through the monitoring of the integrity of the strap networks 21' and 21" by an RFID reader wherein the reading to detect network integrity is through directly coupling the conductors 22 and/or 23 to the touch probe of an appropriately equipped RFID reader (e.g., RFID reader 25 shown in FIG. 6) as described elsewhere herein. Otherwise, the functioning is as described in connection with blister pack 130.

In addition, a strap or chip network or a sealing sheet 120 with a strap or chip network provided thereon may also cover the base to prevent tampering with the medication from the base side of the blister pack as shown in FIGS. 18-21, which show various embodiments of such a blister pack 180 having a base 185 including cavities 190.

Figure 16:
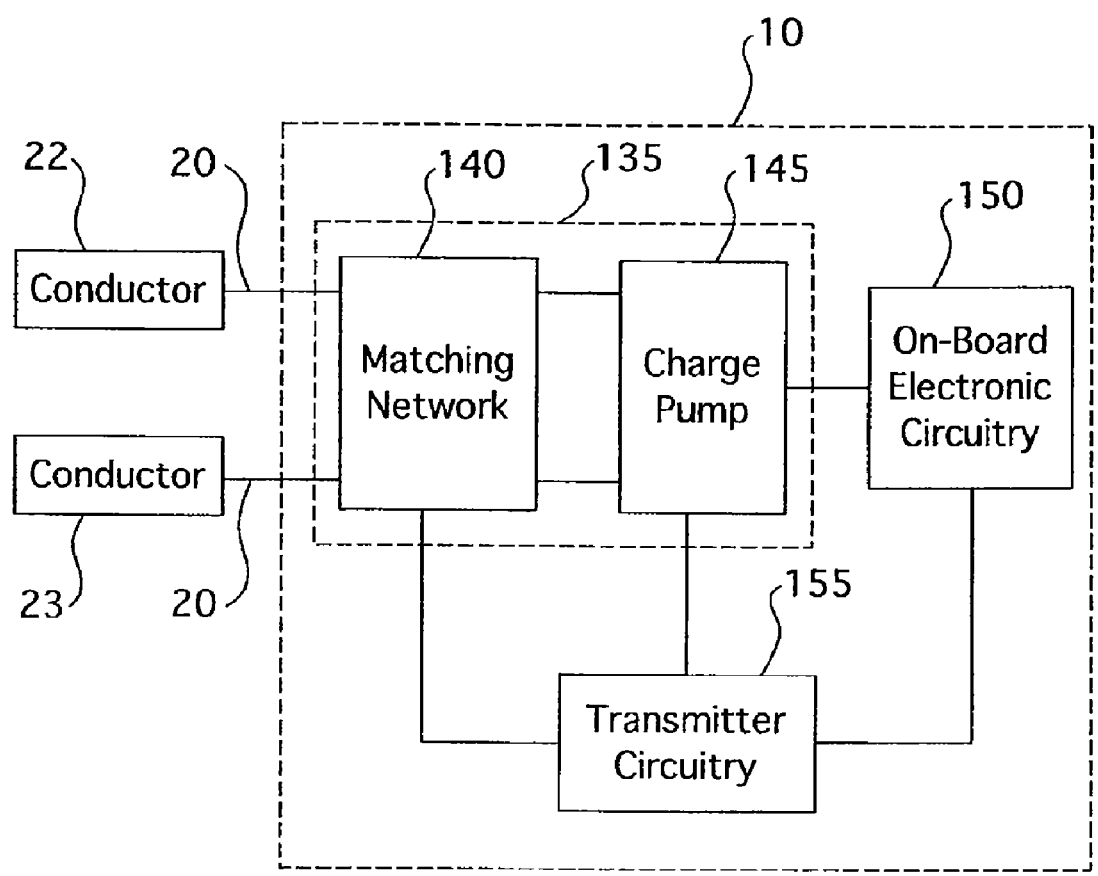
FIG. 16 is a schematic representation of one particular embodiment for employing RF energy harvesting to power each of the chips in a strap or chip network.

FIG. 16 is a schematic representation of one particular embodiment wherein passive technology in the form of energy harvesting as described elsewhere herein is employed to power each of the chips 10 in the strap network 21. As seen in FIG. 16, each chip 10 includes energy harvesting circuitry 135 that is operatively coupled to on-board electronic circuitry 150, which in turn is operatively coupled to transmitter circuitry 155. In operation, the energy harvesting circuitry 135 is structured to receive RF energy (e.g., from a reader device) and harvest energy therefrom by converting the received RF energy into DC energy, e.g., a DC voltage. The DC voltage is then used to power the on-board electronic circuitry 150 and the transmitter circuitry 155. The transmitter circuitry 155 is structured to transmit an RF information signal to a receiving device such as an RFID reader. The on-board electronic circuitry 150 may include, for example, control circuitry, such as a microprocessor, a microcontroller or some other suitable custom control circuitry, an associated memory, additional logic circuitry, and/or a sensing circuit for sensing or measuring a particular parameter (such as temperature, in which case a thermistor may be included in the sensing circuit).

In the particular embodiment shown in FIG. 16, the energy harvesting circuitry 135 of each chip 10 includes a matching network 140 electrically connected to the first and second conductors 22 and 23 (through the strap leads 20), and therefore to the antenna 24 (FIG. 13). The matching network 140 is also electrically connected to a voltage boosting and rectifying circuit preferably in the form of a one or more stage charge pump 145. Charge pumps are well known in the art.

Basically, one stage of a charge pump essentially doubles the effective amplitude of an AC input voltage with the resulting increased DC voltage appearing on an output capacitor. The voltage could be stored using a rechargeable battery. Successive stages of a charge pump, if present, will essentially increase the voltage from the previous stage resulting in an increased output voltage. In operation, the antenna 24 receives RF energy that is transmitted in space by a far-field or near field source, such as an RFID reader. The RF energy received by the antenna is provided, in the form of an AC signal, to each charge pump 145 through the associated matching network 140. The charge pump 145 rectifies the received AC signal to produce a DC signal that is amplified as compared to what it would have been had a simple rectifier been used.

In the preferred embodiment, the matching network 140 for each chip 10 is chosen (i.e., its impedance is chosen) so as to maximize some criterion such as the voltage of the DC signal output by charge pump 145. In other words, the matching network 140 matches the impedance of the antenna 24 to the charge pump 145 solely on the basis of maximizing the performance such as DC output of the charge pump 145. In the preferred embodiment, the matching network 140 is an LC circuit of either an L topology (which includes one inductor and one capacitor) or a π topology (which includes one inductor and two capacitors) wherein the inductance of the LC circuit and the capacitance of the LC circuit are chosen so as to maximize the DC output of the charge pump 145. The particulars of the matching network (e.g., the particular LC parameters) may be chosen so as to maximize the output of the charge pump 145 using a trial and error ("annealing") empirical approach in which various sets of inductor and capacitor values are used as matching elements in the matching network 140, and the resulting output of the charge pump 145 is measured for each combination, and the combination that produces the maximum output is chosen. In this process, the input impedance of the charge pump 145 with each matching network combination may be plotted as a point on a Smith chart with a color coding for the amount of energy harvested. After a number of tries, it will be easy to see a clustering of the color coded points to selectively choose other points in or around the cluster to achieve a near optimum value. This trial and error/annealing approach is also described in Minhong Mi, et al., "RF Energy Harvesting with Multiple Antennas in the Same Space," *IEEE Antennas and Propagation Magazine*, Vol. 47, No. 5, October 2005, and Marlin Mickle et al., "Powering Autonomous Harvesting with Multiple Antennas in the Same Space," *IEEE Antennas and Propagation Magazine*, Vol. 48, No. 1, February 2006, the disclosures of which are incorporated herein by reference.

Figure 17:
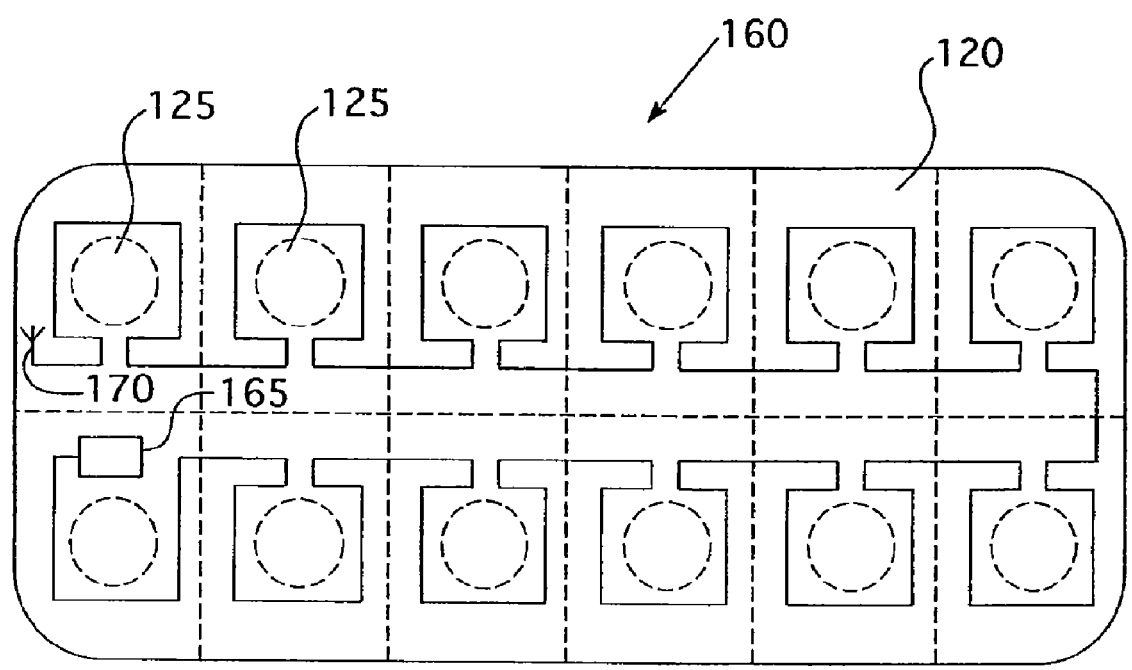
FIG. 17 is a schematic diagram of a blister pack according to another embodiment of the present invention.
Figure 18:
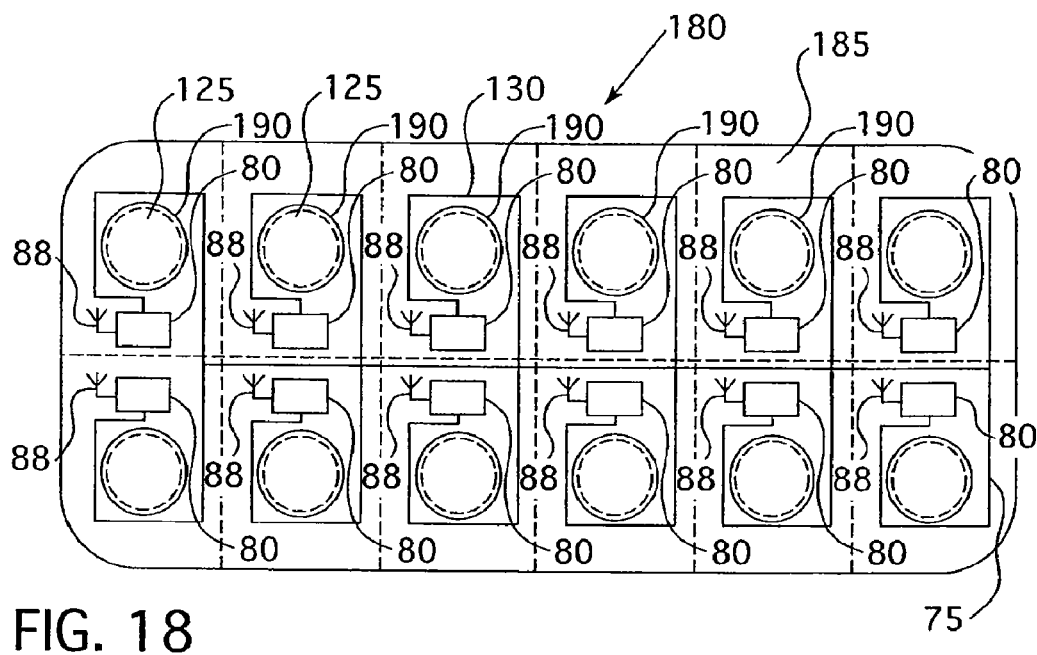
FIG. 18-22 are schematic diagrams of blister packs according to various alternative embodiment of the present invention.
Figure 19:
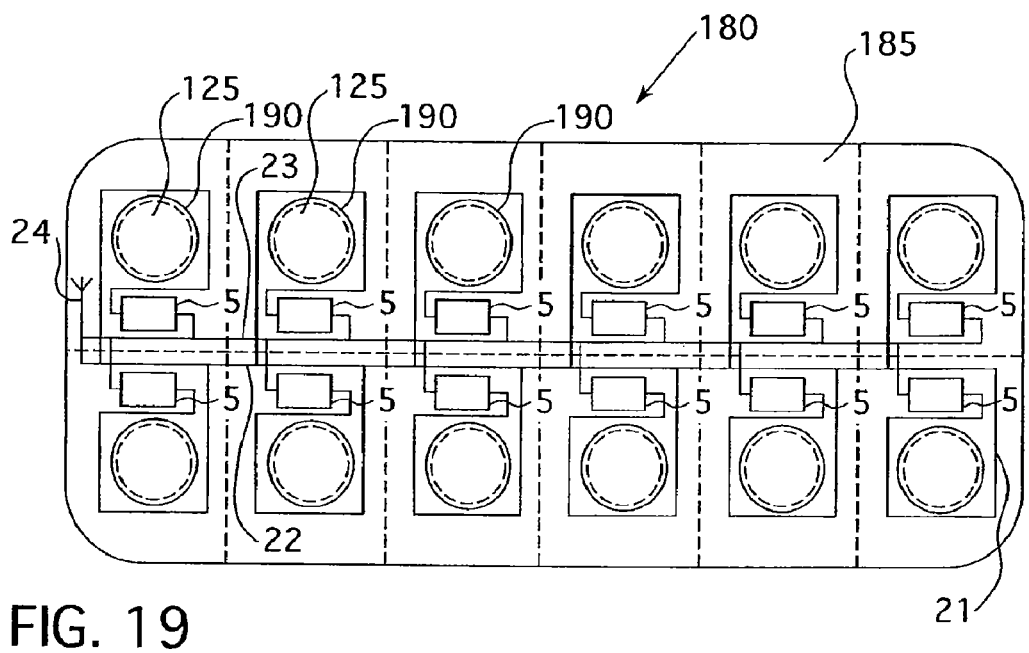
Figure 20:
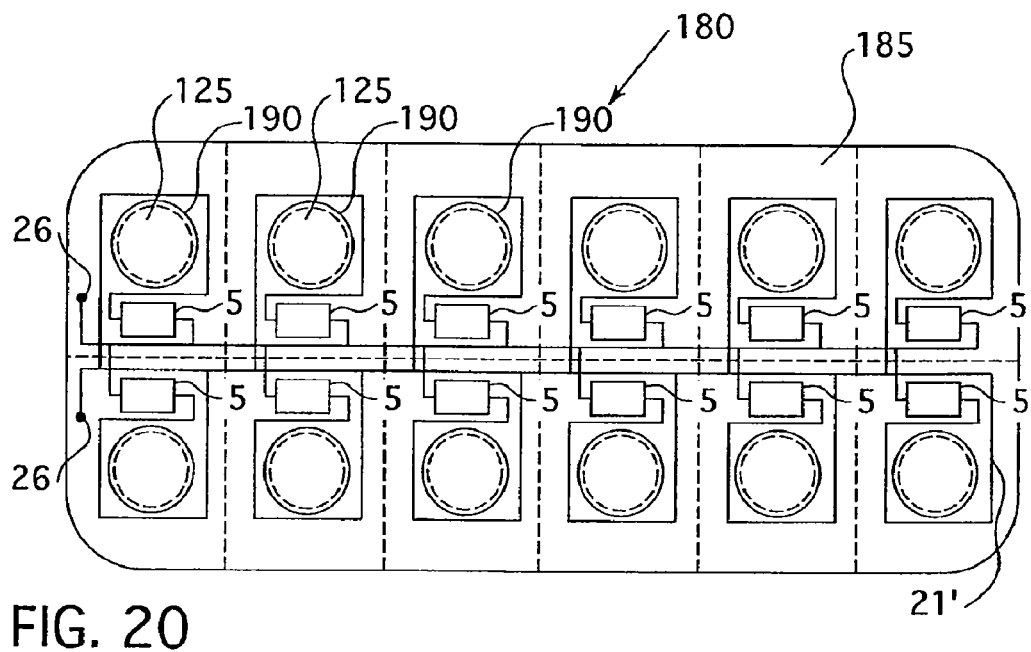
Figure 21:
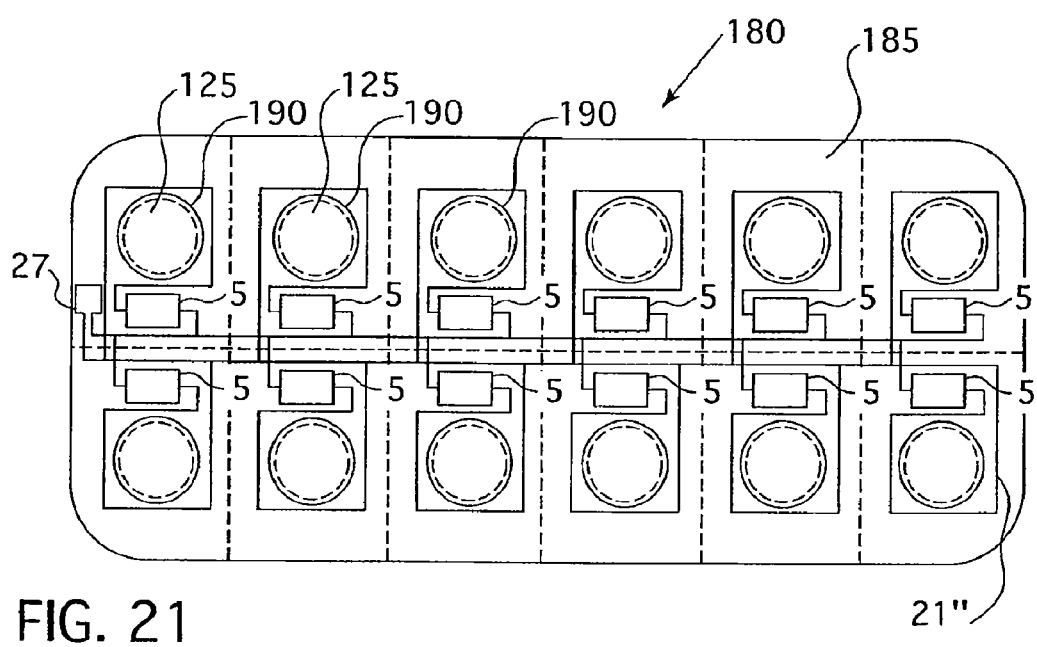
Figure 22:
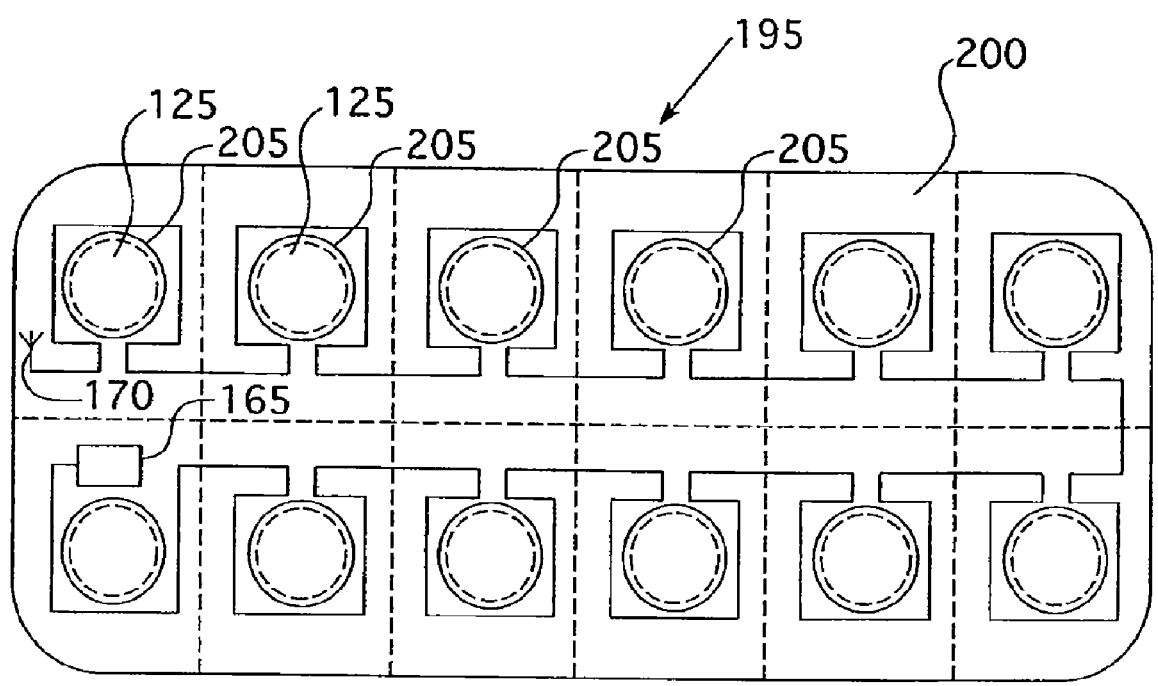

FIG. 17 is a schematic diagram of a blister pack 160 according to another embodiment of the present invention. The blister pack 160 is similar to the blister pack 115 shown in FIG. 12, except that instead of including an RFID chip network 75, it includes an RFID chip 165 operatively coupled to an antenna 170. As seen in FIG. 17, the antenna 170 is provided on the outer surface of the sealing sheet 120 (i.e., the surface facing away from the base), but it may also be provided elsewhere, such as on the inner surface of the sealing sheet 120 or on some intermediate layer of the sealing sheet 120. The antenna 170 preferably substantially or entirely surrounds each of the tablets 125 (or other products) held by the blister pack. In addition, the antenna 170, when undamaged, is tuned to generate RF signals within a predetermined frequency band (including one or more frequencies). Thus, when the chip 165 responds to interrogation signals from a reader such as reader 25, the antenna 170, when undamaged, will transmit an RF signal that is within the predetermined frequency band. In addition, the antenna 170 is structured such that if it is damaged, for example as a result of someone tampering with the blister pack 160, it will be detuned, meaning that it will generate RF signals within a frequency range that is different than the predetermined frequency band. Thus, when the chip 165 responds to interrogation signals from the reader after the antenna 170 has been damaged, the antenna 170 will transmit an RF signal that is outside of the predetermined frequency band. As a result, the reader will be able to detect whether the blister pack has been tampered with based on the frequency of the signal it receives in response to an interrogation signal (within the predetermined frequency band indicates no tamper, and outside the predetermined frequency band indicates tamper). FIG. 22, shows an alternative blister pack 195 including a base 200 and cavities 205, wherein the RFID chip 165 operatively coupled to an antenna 170 on the base 200 of the blister pack 200 to detect tampering for the base side thereof.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A blister pack, comprising:
a base having a plurality of cavities formed therein, each of said cavities holding one of a plurality of products;
a sealing sheet provided on top of said base and covering said cavities;
a network provided on or within one of said sealing sheet and said base, said network comprising a plurality of RFID chips and being structured to receive one or more RF interrogation signals from a reader device, each of said RFID chips being provided adjacent to a corresponding cavity holding one of said products associated with the chip, said network having one or more conductors provided on or within said sealing sheet and operatively coupling all of said RFID chips, wherein said RFID chips are physically interconnected to one another through said one or more conductors, wherein said one or more conductors individually and substantially or entirely surround each of said cavities such that if any one of the cavities is accessed a portion of the one or more conductors surrounding the cavity will be broken and the network will be rendered not intact, and wherein said network, in response to receiving said one or more RF interrogation signals, provides an indication to said reader device as to whether said network is intact based on:
(i) whether one of said RFID chips is able to communicate with all of the other RFID chips of the network through the one or more conductors, or (ii) whether all of said RFID chips of the network are able to receive said one or more RF interrogation signals through the one or more conductors, wherein if said network is intact said network transmits a first response to said reader device in response to said one or more RF interrogation signals, said first response being an indication to said reader device that said network is intact, and wherein if said network is not intact said network in response to said one or more RF interrogation signals either transmits no response to said reader device or transmits a second response to said reader device, said no response and said second response each being an indication to said reader device that said network is not intact.

2. A blister pack, comprising:

a base having a plurality of cavities formed therein, each of said cavities holding one of a plurality of products;

a sealing sheet provided on top of said base and covering said cavities;

a network provided on or within one of said sealing sheet and said base, said network being structured to receive one or more RF interrogation signals from a reader device, said network including a plurality of RFID chips, each of said RFID chips being provided adjacent to a corresponding cavity holding one of said products, said network having one or more conductors provided on or within said sealing sheet and operatively coupling all of said RFID chips, wherein said one or more conductors individually and substantially or entirely surround each of said cavities such that if any one of the cavities is accessed a portion of the one or more conductors surrounding the cavity will be broken and the network will be rendered not intact, wherein said network, in response to receiving said one or more RF interrogation signals, provides an indication to said reader device as to whether said network is intact, wherein each of said RFID chips in said network is operatively coupled to an associated antenna separate from the one or more conductors for receiving RF signals from said reader device, wherein at least one of said RFID chips is adapted to transmit information to said reader device and communicate with each of the other ones of said RFID chips through one or more of said one or more conductors, wherein in response to receiving said one or more RF interrogation signals said at least one of said RFID chips determines whether said network is intact by determining whether it is able to successfully communicate with each of said other ones of said RFID chips through the one or more conductors, and wherein if said network is intact said at least one of said RFID chips transmits a first response to said reader device in response to said one or more RF interrogation signals, said first response being an indication to said reader device that said network is intact, and wherein if said network is not intact said at least one of said RFID chips in response to said one or more RF interrogation signals either transmits no response to said reader device or transmits a second response to said reader device, said no response and said second response each being an indication to said reader device that said network is not intact.

3. The blister pack according to claim 2, wherein each of said RFID chips in said network is powered by the RF signals received from said reader device.

4. The blister pack according to claim 1, wherein said RFID chips are physically connected in parallel to one another through said one or more conductors.

5. The blister pack according to claim 4, wherein said RFID chips are connected in parallel to one another through a first one of said one or more conductors and a second one of said one or more conductors.

6. The blister pack according to claim 4, wherein each of said RFID chips is part of a respective strap.

7. The blister pack according to claim 4, wherein each of said RFID chips is operatively coupled to an antenna through said one or more conductors, said antenna receiving said one or more RF interrogations signals, and wherein each of said RFID chips is adapted to provide its respective response to said reader device through said antenna.

8. The blister pack according to claim 7, wherein each of said RFID chips in said network is powered by RF signals received from said reader device through said antenna.

9. The blister pack according to claim 4, wherein each of said RFID chips is able to receive said one or more RF interrogations signals though direct coupling between said one or more conductors and one or more touch probes provided on said reader device.

10. The blister pack according to claim 9, wherein said RFID chips are connected in parallel to one another through a first one of said one or more conductors and a second one of said one or more conductors, wherein said first one of said one or more conductors is operatively coupled to a first contact and said second one of said one or more conductors is operatively coupled to a second contact, and wherein the coupling between said one or more conductors and said one or more touch probes is through contact between said one or more touch probes and said first and second contacts.

11. The blister pack according to claim 9, wherein said one or more touch probes are a single touch probe, wherein said RFID chips are connected in parallel to one another through a first one of said one or more conductors and a second one of said one or more conductors, wherein said first one of said one or more conductors is operatively coupled to a first terminal of an antenna and said second one of said one or more conductors is operatively coupled to a second terminal of said antenna, through said one or more conductors, and wherein the coupling between said one or more conductors and said one or more touch probes is through contact between one of said first one of said one or more conductors and said second one of said one or more conductors and said single touch probe.

12. The blister pack according to claim 1, wherein every one of said products has a respective one of said RFID chips adjacent thereto.

13. The blister pack according to claim 1, wherein less than every one of said products has a respective one of said RFID chips adjacent thereto.

14. A blister pack, comprising:

a base having a plurality of cavities formed therein, each of said cavities holding one of a plurality of products;

a sealing sheet provided on top of said base and covering said cavities;

one or more networks provided on or within said sealing sheet and on or within said base, each of said one or more networks being structured to receive one or more RF interrogation signals from a reader device, each of said one or more networks including a plurality of RFID chips, each of said RFID chips being provided adjacent to a respective cavity holding one of said products, each of said one or more networks having one or more conductors provided on or within one or both of said sealing sheet and said base and operatively coupling said RFID chips, wherein in each network the RFID chips are physically interconnected to one another through the one or more conductors of the network and said one or more conductors individually and substantially or entirely surround each of said cavities such that if any one of the cavities is accessed a portion of the one or more conductors surrounding the cavity will be broken and the network will be rendered not intact, wherein each of said one or more networks, in response to receiving said one or more RF interrogation signals, provides an indication to said reader device as to whether the network is intact based on: (i) whether one of the RFID chips of the network is able to communicate with all of the other RFID chips of the network through the one or more conductors of the network, or (ii) whether all of the RFID chips of the network are able to receive said one or more RF interrogation signals through the one or more conductors of the network, wherein for each of said one or more networks: (i) if the network is intact said one of the RFID chips of the network transmits a first response to said reader device in response to said one or more RF interrogation signals, said first response being an indication to said reader device that said network is intact, and (ii) if the network is not intact said one of the RFID chips of the network in response to said one or more RF interrogation signals either transmits no response to said reader device or transmits a second response to said reader device, said no response and said second response each being an indication to said reader device that the network is not intact.

15. The blister pack according to claim 14, wherein one or more of the one or more conductors in each of the one or more networks entirely surround each of the products having a chip adjacent thereto such that one or more of said one or more conductors are damaged when any one of the products having a chip adjacent thereto is accessed, thereby causing said network to no longer be intact.

16. The blister pack according to claim 14, wherein one or more of the one or more conductors in each of the one or more networks substantially surround each of the products having a chip adjacent thereto such that one or more of said one or more conductors are damaged when any one of the products having a chip adjacent thereto is accessed, thereby causing said network to no longer be intact.

17. The blister pack according to claim 14, wherein said one or more networks are a single network provided on or within both said sealing sheet and said base.

18. The blister pack according to claim 14, wherein said one or more networks are a first network provided on or within said sealing sheet and a second network provided on or within said base.

19. A method of detecting that a blister pack may have been tampered with, said blister pack having a base having a plurality of cavities formed therein, each of said cavities holding one of a plurality of products, and a sealing sheet provided on top of said base and covering said cavities, the method comprising;
   providing an RFID chip and an antenna on said blister pack, said RFID chip being operatively coupled to said antenna, wherein said antenna substantially or entirely and individually surrounds a top of each of said cavities, said antenna being structured to transmit RF signals having a frequency within a predetermined frequency range when in an undamaged condition and to be detuned when damaged, said antenna, when detuned, being structured to transmit RF signals having a frequency outside of said predetermined frequency range;
   transmitting an RF interrogation signal from a reader device to said RFID chip;
   in response to said RF interrogation signal, receiving an RF response signal from said RFID chip that is transmitted through the antenna; and determining whether said blister pack may have been tampered with based on a frequency of said RF response signal, wherein a received RF response signal of a first frequency outside of said predetermined frequency range indicates tampering and a received RF response signal of a second frequency within said predetermined frequency range indicates no tampering.

20. The method according to claim 19, wherein said antenna is provided on or within said sealing sheet.

21. The method according to claim 19, wherein said antenna is provided on or within said base.

\* \* \* \* \*